United States Patent [19]
Bartlett

[11] 3,826,890
[45] July 30, 1974

[54] WELDING SYSTEM CONTROLLER
[76] Inventor: Peter G. Bartlett, 2336 E. 11th St., Davenport, Iowa 52803
[22] Filed: Sept. 1, 1972
[21] Appl. No.: 285,797

[52] U.S. Cl. .............................. 219/131 R, 219/135
[51] Int. Cl. .............................................. B23k 9/10
[58] Field of Search ........ 219/131 R, 131 WR, 135, 219/137; 321/22, 19; 307/293

[56] References Cited
UNITED STATES PATENTS

| | | | |
|---|---|---|---|
| 3,549,979 | 12/1970 | Stearns et al. ........................ | 321/19 |
| 3,597,580 | 8/1971 | Stearns et al. ...................... | 219/135 |
| 3,614,377 | 10/1971 | Stearns et al. .................... | 219/131 R |
| 3,627,976 | 12/1971 | Stearns............................. | 219/131 R |
| 3,662,147 | 5/1972 | Ogden, Sr. et al............... | 219/131 R |

OTHER PUBLICATIONS
Capacitors, Magnetic Circuits, and Transformers" by Matsch 1964 pp. 130-131 & 142-146.

Primary Examiner—J. V. Truhe
Assistant Examiner—G. R. Peterson
Attorney, Agent, or Firm—William D. Hall

[57] ABSTRACT

A welding system controller for use with square hystersis loop welding transformers. The controller allows for at least two time-spaced welding operations to be performed, each of the welding operations having its time duration and heat intensity independently selected. Although heat intensity is a non-linear function, a novel phase control circuit for the welding transformer switches enables a linear heat intensity control to be used for selecting the heat intensity. This is desirable for linear selectors are less expensive than non-linear selectors. The controller also provides the protective circuit necessary when welding transformers with a square loop hystersis curve are used. Furthermore, the controller provides for a modified phase control for the initial cycle of welding as is also necessary when square loop hystersis curve welding transformers are used. In addition after the last welding cycle a controlled return to quiescent conditions is made.

12 Claims, 7 Drawing Figures

WELDING SYSTEM CONTROLLER

BACKGROUND OF THE INVENTION

Although electrical welding is a technique that has been used for many years, the desire to automate the welding operation has introduced additional complexity into the problem of providing adequate control circuitry. In earlier times, when an operator could adjust the welding parameters, heat intensity and time duration, in light of actual conditions as the welding operation took place, control circuits were much simpler and subjected to less severe requirements than is the case today. Furthermore, with the advent of square loop hystersis curve welding transformers a further complicating factor has entered into the requirements for any control circuit.

An automatic welding controller must be one which is capable of being preset to a certain selected heat intensity and weld time duration and which is capable of controlling the weld heat intensity to the selected value and also timing the welding operation and ceasing welding at the proper time. Although timing the welding operation is not a significantly difficult control operation, controlling the welding heat intensity to a preselected value is more difficult. Although, for economy reasons, a linear type control would be desired for selecting the required heat intensity, until the present time the art has found it difficult or impossible to provide a linear heat selector which is truly capable of controlling the weld heat intensity as desired. The difficulty lies in the fact that the heat delivered to the weld point is proportional to the power in the welding transformer; however, as a function of time, the power introduced to the welding transformer is not linear. Therefore controlling, linearly, the proportionate time of the cycle during which welding current flows to linearly control the heat input cannot be accomplished. Applicant has devised a welding control circuit which is capable of being used with a linear heat intensity selector but which, at the same time, accurately controls the heat intensity at the weld point.

Although the square-loop hystersis curve welding transformers are more efficient in converting electrical energy input to heat output at the welding point than transformers whose hystersis curve is not square, these transformers do introduce complexities into the welding control circuit requirements. Due to the squareness of the hystersis curve, these transformers can be more easily saturated than can transformers whose hystersis curve is more gradual. In view of the fact that a saturated transformer provides essentially no impedance to the current in the transformer, saturation must be avoided. Especially in view of the high power intensities employed in welding transformers, a saturated transformer can easily cause great damage to itself and its associated machinery. For instance, in a 440 volt welding transformer which normally operates at current levels of 2,000 amperes, a shorted transformer, which is essentially what a saturated transformer appears as, can easily induce 30,000 amperes of current and more. Even the heavy welding machinery will not withstand current of this magnitude. The magnetic forces induced by this current can physically tear apart an installation before the heat causes sufficient fire damage to open the circuit and thus stop this current flow. Even if protective devices are installed, the transformer itself may be damaged and in any event, even if no damage occurs, obviously the welding operation will cease, requiring operator attention and equipment down time. For this reason, it is essential to insure that the welding transformer does not become saturated. Since the welder is an alternating-current device, to use its maximum power handling capacity without saturating it, the power applied to the welding transformer must be balanced in order to symmetrically transverse the hystersis loop and avoid saturation. To this end, as will be explained, the control circuit must ensure that the power applied to the welding transformer is balanced and that pulses of the same polarity never follow one another.

The foregoing requirement becomes even more complicated in automatic machinery such as disclosed herein, in which the enabling signal to the welding control circuit cannot be controlled so as to always occur on the same excursion of the power source. To this end, the control circuit of applicant's invention includes provision for remembering in what direction power was last applied to the welding transformer so that the next operation will commence with power applied in the opposite sense.

As set out above, the welding control of applicant's invention provides for at least two automatically executed welds which may occupy different durations of time and may have different heat intensity requirements. Since it would obviously be wasteful of control apparatus to provide two separate control circuits for each of the welds, a common circuit is provided which is enabled at the proper time by either the first or the second of the weld parameters.

Applicant's invention provides a welding control circuit meeting the foregoing requirements which is composed entirely of solid state circuitry with its attendant low cost and high reliability.

BACKGROUND

Before describing how the circuits of the instant invention operate, it is worthwhile to set out some of the basics of electrical welding, as a framework for the subsequent discussion. The primary circuit of the welding transformer includes a pair of oppositely poled silicon control rectifiers which are alternately controlled to govern current flow in the circuit. As is well known, since the transformer is an inductive load, some phase delay exists between the voltage and current. For this reason the signal to fire one of the SCR's must be delayed after the voltage goes through zero. If merely this phase delay is inserted between the time the voltage waveform goes through zero and the time one or the other of the SCR's is fired, a full 180° current pulse is produced causing the heat generated by the current flowing in the secondary circuit to be the maximum possible for that voltage applied to the circuit. Any further phase delay which may be inserted between the zero crossing of the voltage wave-form and the firing of one or the other of the SCR's will reduce the duration of the current pulse in the transformer secondary and correspondingly reduce the heat intensity to the weld point. Thus, by adjusting the delay, appropriately, the welder can be caused to generate any selected percentage of maximum heat intensity from almost zero to 100 percent.

Figure 7A:
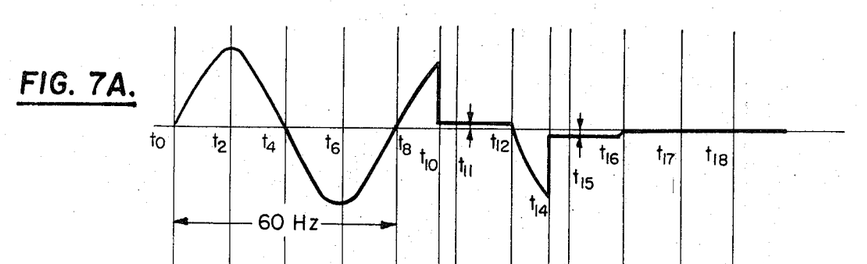
FIG. 7 illustrates some typical waveforms at various portions of applicant's control circuit.

The diagram of FIG. 7A shows representative voltage waveforms in the control transformer. The sequence of waveforms in FIG. 7A is not intended as representative and is merely shown for purposes of this description. The waveform diagram of FIG. 7A, from $T_0$ to $T_8$ shows the voltage applied to the control transformer when neither of the SCR's has fired and thus no welding has taken place. As the voltage increases again from $T_8$ to $T_{10}$, the sharp drop in voltage is caused by one of the SCR's firing, and the current flowing through the welding transformer is generating heat for the welding operation. The delay time, that is, the time from $T_8$ to $T_{10}$ is related to the amount by which the resultant current pulse is less than its maximum duration and thus also represents the difference between the actual heat intensity produced by the current pulse and the maximum heat intensity. The current pulse is now one lasting from $T_{10}$ to approximately $T_{12}$. In a similar manner, on the negative half-cycle of voltage, and with the same delay time, the other SCR fires at $T_{14}$, indicating that from $T_{14}$ to approximately $T_{16}$ a second current pulse has been generated to perform welding. Again, the duration of this pulse, from $T_{14}$ to $T_{16}$, is indicative of the amount of heat generated by the pulse.

DETAILED DESCRIPTION OF THE PREFERRED EMBODIMENT

Figure 1:
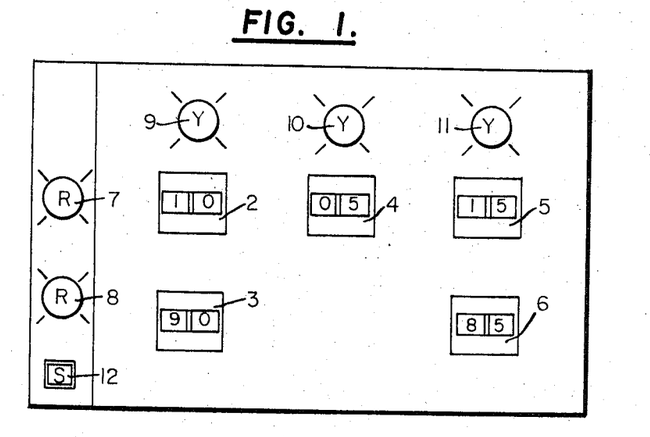
FIG. 1 shows a control panel for the welding controller of applicant's invention.

FIG. 1 shows the operator control panel for setting the various parameters to control the welding operation through applicant's control circuit. This panel provides for setting, on rotatable thumbwheel switches, 2–6, the various welding parameters for two different welds and a time delay between the welds. In addition, indication lights 7–11 indicate the condition of the process during the operation. Push button 12 is a start button for initiating the sequence of operations.

Thumbwheel switches 2, 4 and 5 control, respectively, the time duration of weld 1, the weld delay, and weld number 2. That is, the setting of thumbwheel switch 2 determines the time duration for weld number 1. This is generally in terms of the number of cycles of the power source, but any other time base may be used. Thumbwheel switch 4 provides the time duration for the delay between the ending of weld number 1 and the beginning of weld number 2. This is provided in the same time base as that used to time the duration of weld number 1. In a like manner, thumbwheel switch 5 provides for the time duration of weld number 2. Thumbwheel switch 3 provides for the heat intensity selection for weld number 1. This is a percentage of full intensity, thus a setting of 50 provides for half maximum power intensity and the setting shown in FIG. 1, 90, provides for 90 percent of the potential heat intensity of the device. In a like manner thumbwheel switch 6 provides for a heat adjustment for weld number 2. Indicator lights 9, 10 and 11 indicate, when lit, that the machine is in either weld number 1, weld delay or weld number 2 modes, respectively. Indicator light 7, when lit, indicates that the welding control circuit has detected a circuit fault in that no current is being supplied to the weld switch. Indicator light 8, when lit, indicates a welding switch fault, or lack of voltage at the welding switch. In order to see how the welding control circuit accomplishes the functions which are selected on the front panel of FIG. 1 we turn now to a description of FIG. 2, a functional block diagram of the system.

Figure 2:
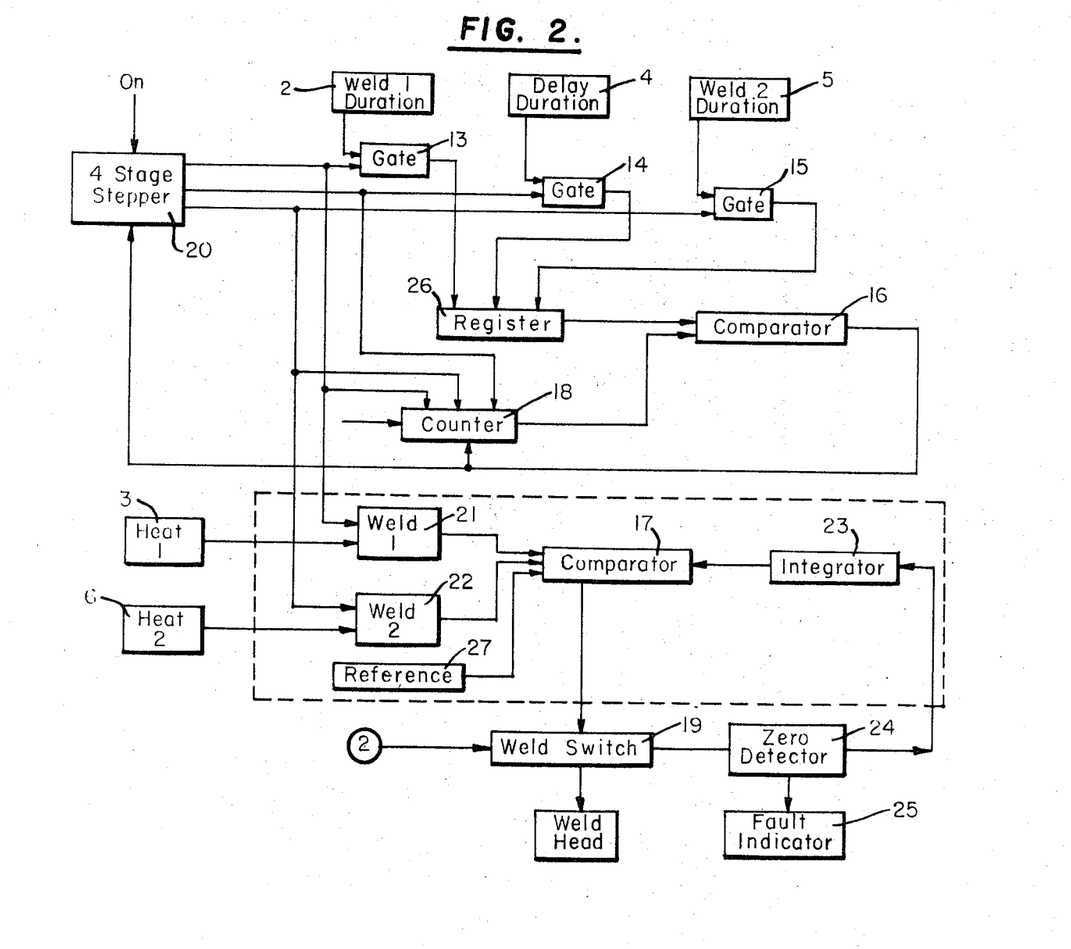
FIG. 2 shows a block diagram of the welding control of applicant's invention representing some of the different functional elements found in the circuit.

Included diagrammatically in FIG. 2 are blocks labeled Weld 1 Duration, 2, Delay Duration, 4, and Weld 2 Duration, 5. These are intended to represent thumbwheel switches shown on FIG. 1 for indicating the duration of these respective periods. Also shown on FIG. 2 are blocks designated as Heat 1 and Heat 2, and these are intended to represent the heat settings for the two welds and may also comprise thumbwheel switches, as shown in FIG. 1. The 4 Stage stepper, 20, during periods of no operation, is at stage 0. The apparatus included within the dotted line in FIG. 2 comprises portions of the current switch driver, shown in more detail in FIG. 4. This apparatus includes switches Weld 1 and Weld 2, 21 and 22 respectively, which call for welding with respect to either heat setting 1 or heat setting 2 respectively. To provide the proper time delay comparator 17 compares the heat setting, either 1 or 2, with a voltage provided by the integrator 23 in order to control the weld switch 19 to be energized at the proper time in accordance with the heat setting. The weld switch 19 is fed by a suitable power source, of alternating current and drives the welding head. Weld switch 19 also provides input information for the zero crossing detector 24 which drives the integrator 23 and also provides either current or switch fault indication signals to the fault indicator 25 on the control panel of FIG. 1. FIG. 2 also includes a second comparator 16, a register 26 and a counter 18. Comparator 16, register 26 and counter 18 control the duration of weld 1, weld 2 or the delay between welds in response to the settings on thumbwheel switches 2, 4 and 5. Comparator 16 is digital in nature, whereas comparator 17 is an analog, or voltage comparator.

Before proceeding onto a detailed discussion of the circuit, it will be useful to consider the manner in which the circuit of the instant invention phase controls the current through the welding transformer.

The transformer primary is continually energized through the weld switch with alternating current and control of the amount of heat applied to the weld is effected by governing the extent to which each of a pair of SCR's is permitted to conduct on each respective half cycle of the transformer primary voltage. The two SCR's are governed by a control circuit to which is applied a voltage whose amplitude is preselected in accordance with the setting of a heat intensity control. It is preferable that the relationship between the amplitude of this control voltage and the setting of the heat intensity control be linear to avoid thereby the need for nonlinear potentiometers.

It is not feasible to use such control voltage directly to govern the firing of the two SCR's on each half cycle since this would result in a non-linear relationship between control voltage amplitude and actual heat intensity. The reason for this is that the amount of heat provided at the weld is directly related to the power through the transformer and this is a function of the area under the current waveform.

The present invention circumvents this difficulty be generating for each half cycle of the control transformer voltage a waveform which is the integral of the sine wave loop of that half cycle. Now, by continually comparing on each sine wave half cycle the amplitude of the control voltage with the amplitude of the integrated wave, and firing the relevant SCR only when the amplitude of the integrated wave matches the amplitude of the control voltage, it is possible to achieve a linear relationship between the setting of the heat intensity control and the power to the load.

Figure 6:
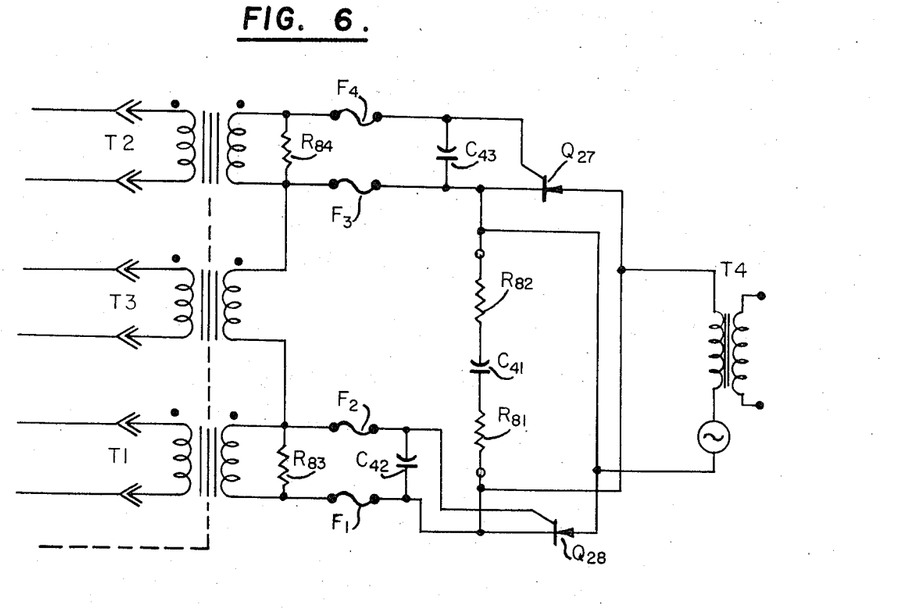
FIG. 6 is a circuit diagram of the welding switch of applicant's control circuit.

Reference to FIG. 6 shows that current through the welding transformer $T_4$ is controlled by a pair of oppositely poled SCR's Q27 and Q28. Depending upon the phase of the alternating current voltage applied to the transformer, one or the other of the SCR's will determine the initiation of current flow through the transformer winding and thus, the application of heat to the welding point. By varying the amount of delay between the time the voltage goes through zero and the time that the appropriate SCR fires, more or less heat can be applied to the welding point. A long delay will result in a minimum amount of heat while a short delay will result in a maximum or near maximum amount of heat.

Figure 3A:
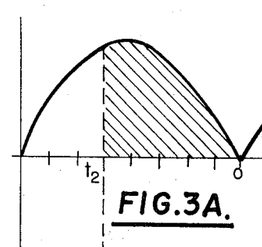
FIG. 3 is a diagram of a waveform generated in the phase control circuit portion of applicant's invention.

Since the heat applied to the welding point is proportional to the area under the voltage waveform, a circuit which merely initiates firing of the SCR based upon a linear delay will not, for most percentage heat settings, provide an accurate amount of heat to the welding point. FIGS. 3A, C, E, G, I, and K show the voltage waveform at an appropriately poled SCR. (Since the two SCR's are opposite in sense, the full-wave rectified sine wave shown in these figures is appropriate when one understands that one SCR will be fired by the voltage of FIG. 3A while a different one will be fired by the voltage of FIG. 3E.)

Below FIGS. 3C, G, and K, respectively, FIGS. 3D, H, and L show a linearly rising voltage which a completely linear phase control circuit would employ. To the left of FIGS. 3D, H, and L are refernce points for 25, 50, and 75 percent heat intensity settings. Assuming a linear comparison, the SCR related to FIG. 3C will be fired at time $t_1$, that is a time $t_1$ subsequent to the zero crossing of the voltage. By reason of its characteristic, the SCR would remain on until the current through it returned to zero. Thus, both shaded portions of FIG. 3C represent the heat intensity that would be produced at the weld point, assuming a linearly operating control circuit set at 75 percent heat intensity. In a like manner, FIG. 3G shows the SCR firing at time t3 for a 50 percent heat setting using a linearly operating control circuit, and FIG. 3K shows the SCR firing at time $t5$ for a 25 percent heat setting. As will be seen below, the times t1 and $t5$ are inaccurate for the 75 percent and 25 percent heat settings. Thus, it will readily be apparent that the shaded portions of the half cycles in FIGS. 3C and 3K do not comprise 75 percent and 25 percent, respectively, of the total area under each loop.

Figure 3B:
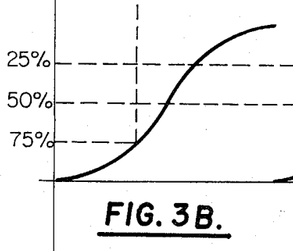
Figures 3C, 3G, 3K:
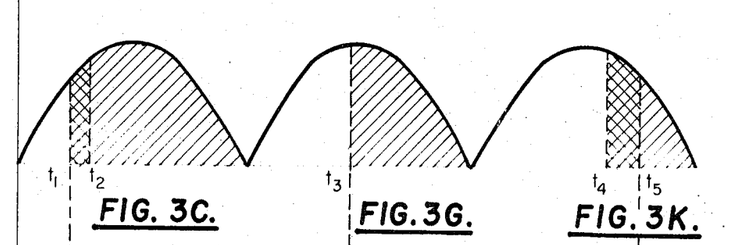
Figure 3D:
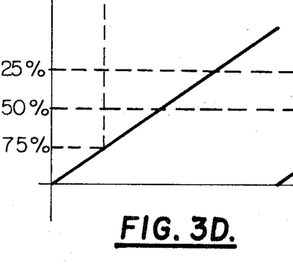
Figures 3E, 3I:
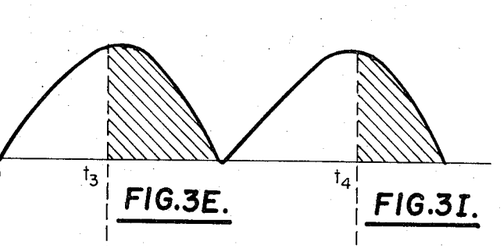

FIG. 3B shows the integral of the waveform of FIG. 3A. The phase control circuit of applicant's invention employs a voltage waveform of this type produced by integrator 23 against which is compared a control voltage which is linearly related to a heat intensity setting. The amplitude of the control voltage is selected to be a predetermined portion of the maximum amplitude of the integrated waveform. Since the comparison operation determines the delay, and not the time duration of each current pulse, the linearly selected control voltage is the complement of the heat intensity setting. Thus, for a 75 percent heat intensity setting, the control voltage is set at an amplitude which is 25 percent of its maximum and thus, of course, at 25 percent of the maximum voltage attained by the integrator on each half cycle. When the integrated voltage exceeds this level, the SCR is enabled at time $t2$ as shown in FIG. 3A. Thus, the shaded area in FIG. 3A represents 75 percent of the total area under the curve in FIG. 3A, accurately providing a 75 percent maximum heat intensity to the weld point. A comparison of the proper firing time $t2$ with the incorrect time $t1$ shown in FIG. 3C shows that the double cross-hatch portion of FIG. 3C represents the excess heat, over 75 percent, that would be delivered to the weld point using a linear comparator. Applicant's use of the integrated sine wave allows a linear potentiometer to be used for the selection device while at the same time accurately controlling the SCR to provide the required heat intensity. As shown in FIGS. 3E, F, G, and H, it is only for a 50 percent heat setting that the firing point $t3$ is properly determined by both applicant's phase control circuit and the completely linear circuit.

Figures 3F, 3J:
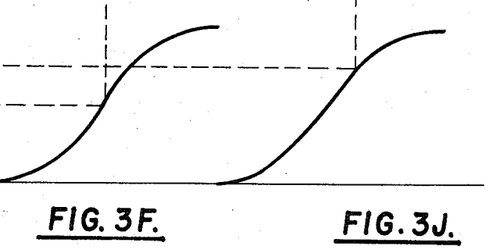
Figure 3H:
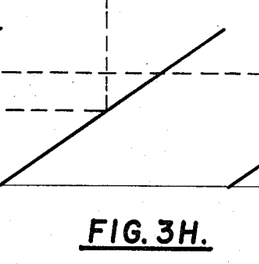
Figure 3L:
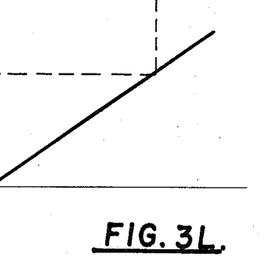

FIGS. 3L and 3K show the firing point T5 for a 25 percent heat setting using a linear comparison. Applicant's invention employs the reference potential shown in FIG. 3J such that a 25 percent heat setting determines the firing time $t4$ shown in FIG. 3I. The shaded portion of FIG. 3I thus represents 25 percent of the total area under the curve 3I and thus accurately provides 25 percent of the maximum heat intensity at the welding point. The double shaded portion in FIG. 3K shows the amount by which the completely linear comparison is in error.

OPERATION

In operation, when the cycle of operation is initiated, the stepper 20 steps to its first stage enabling gate 13 to set the register 26 with the numerical indication of the weld 1 duration switch. At the same time, counter 18 is enabled to begin counting signals synchronized with the power line. The source of these signals will be explained later.

Also, when the four stage stepper 20 is set to stage 1, weld 1 is enabled to provide comparator 17 with a voltage in accordance with the setting of the heat 1 thumbwheel switch on the control panel. The first weld now occurs. Previous to this time, a reference voltage source had been supplied by reference source 27 to the comparator 17. The integrator 23 provides comparator 17 with properly shaped signals, as shown in FIG. 3B, related in time to the power line voltage, to phase control the weld switch 19 in accordance with the heat 1 setting.

The signals counted by counter 18 are related to the power line voltage waveform. When comparator 16 registers that the weld 1 duration set into the thumbwheel switches on the control panel has been accomplished, which is determined by counter 18 counting up to the value stored in register 26, the comparator 16 provides a reset signal for counter 18 and also provides a stepping signal for the four stage stepper 20 to step into its second stage. At this time, the weld 1 is disabled, by reason of the removal of the four stage stepper 20 from stage 1 to stage 2. This terminates the first weld.

The output from the second stage of the stepper 20 enables gate 14 to set the register 26 with the numerical contents of the delay duration thumbwheel switch on the control panel. As before, counter 18 begins counting and when comparator 16 indicates that counter 18 has counted up to the value stored in register 26, it provides a reset signal for counter 18 and also steps the four stage stepper 20 to its third stage. This terminates the preselected delay time between welds. At this time, gate 15 is enabled to provide the numerical contents of the weld 2 duration thumbwheel switch to register 26, and counter 18 begins counting time again. However, with the enablement of the third stage of the four stage stepper 20, the weld 2 is enabled to provide the heat 2 setting to comparator 17. As before, comparator 17 had, during the delay duration, been provided with a reference signal. At this time, however, zero detector 24 providing signals to integrator 23 acts in conjunction with comparator 17 to control the firing of weld switch 19 at the proper time, in accordance with the heat 2 setting so as to provide the desired heat intensity to the weld point through the weld head. Weld 2 is now initiated. Weld 2 is terminated when counter 18 counts up to the value in register 26. Comparator 16 produces a signal which steps the stepper 20 to its zero stage and resets the counter.

Figure 4:
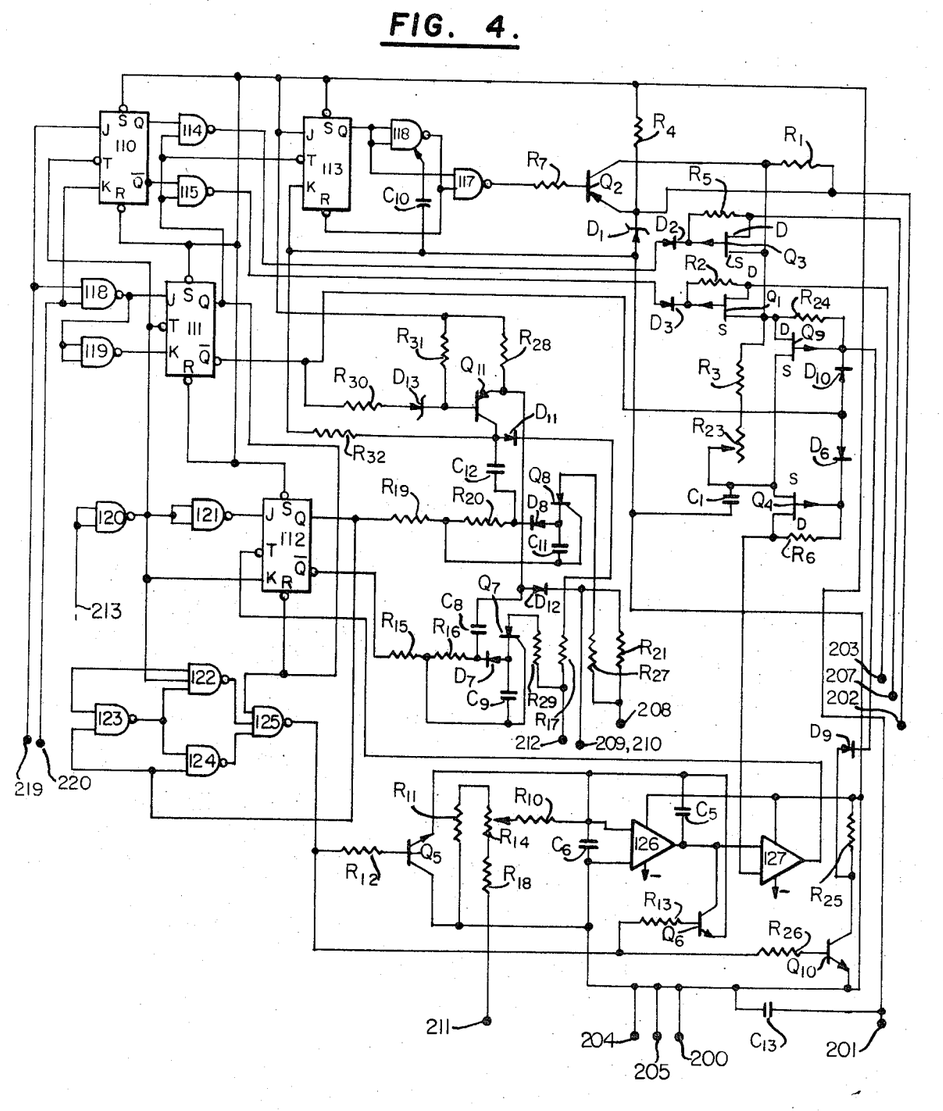
FIG. 4 is a circuit diagram of the current switch driver portion of applicant's control circuit.

In order to fully understand applicant's invention, which is particularly concerned with the initiation of the welding operation, the termination of the welding operation and proper phase control for the weld switch 19, reference should be had to the detailed showing of the circuitry in FIG. 4 which illustrates that which is included within the dotted portion of FIG. 2.

DESCRIPTION

Before discussing the detailed operation of the circuit shown in FIG. 4, it will first be instructive to indicate the general functions performed by the elements in FIG. 4 and their interrelationship with the other parts of the welding control system. As shown in FIG. 2, the circuit of FIG. 4 receives input signals indicating not only that a request for a weld has been made, but also indicating the particular heat control setting which is applicable for that particular weld. These signals come in at terminals 219 and 220 (FIG. 4) and are, respectively, the input signals to weld 1 and weld 2 switches on FIG. 2 from the four stage stepper. These signals provide inputs to flip-flop 110. Depending upon which of the two weld heat controls is called for, either Q1 or Q3 will be enabled from the output of either gate 114 or gate 115. Q1 and Q3 provide a coupling for the heat setting at inputs 203 and 207, which are the heat 1 and heat 2 input signals, as shown in FIG. 2. These voltage levels, through C1 and Q4 provide one of the inputs to comparator 127 (shown as comparator 17 in FIG. 2).

When a weld signal appears at either terminal 219 or 220, the output of gates 118 and 119 are changed providing an input signal to flip-flop 111 which is capable of changing its output when the T input encounters a negative transition. The T input to flip-flop 111 comes from gate 120. The input signals to gate 120 are timing signals which are derived from the zero detector 24 through terminal 213. When the T input signal is present on flip-flop 111 it can change state in response to its inputs from gate 118 and gate 119. As will be made clear below, Q11 is turned on. This provides a path for charging capacitor C12 which is associated with Q8 in providing the firing signal for the SCR's in the weld switch 19.

The same timing signals from the zero crossing detector 24, inputted at terminal 213 through gate 120 and then through gate 121 also provide input signals for flip-flop 112 and also drive counter 18, in FIG. 2. The state of flip-flop 112 controls which of the two SCR's, Q7 or Q8, fires. The firing of either Q7 or Q8 provides a signal over terminals 210 and 212 or terminals 208 and 209 to the weld switch 19. In order to prevent the welding transformer from saturating, these SCR's must be alternately fired. This is true both during any particular welding sequence and if a particular welding sequence ends with Q7 having been fired and the next sequence must begin with Q8 firing. This requirement is dictated by the square hystersis loop characteristic of the welding transformer. If the transformer does not alternately receive current from two directions then current travels in the same direction as before, the transformer saturates and appears as a short circuit which can result in disastrous consequences. As a result, flip-flop 112 is the device which remembers the sense in which the transformer had last conducted to ensure that the next time the transformer conducts, it will be in the opposite sense. The output of comparator 127 is inputted to flip-flop 112 as a clocking input, and thus when the comparison is satisfied this signal goes low allowing the flip-flop to change state and fire Q7 and Q8 to cause conduction in the transformer.

Amplifier 126, which feeds comparator 127, is an integrator which produces the signals shown in FIGS. 3B, 3F, and 3J. Its input, for this purpose, comes from the zero crossing detector 24 through terminal 211. The integrator is controlled through Q5 and Q6 by the combination of gates 122, 123, 124, and 125. These four gates, in response to timing input signals from gate 120 and system status inputs from flip-flop 112 and flip-flop 111 determine when the integration should begin.

The remaining function to be explained on FIG. 4 is that carried out by flip-flop 113, gates 116, 117 and Q2. The circuit provides a transition for the phase delay at the termination of a weld so that if welding is reinitiated immediately balanced operation at the transformer may continue. The only function of this circuit is during the transition from welding to no welding. At all other times it performs no function as Q2 is cut off.

In further explanation of the elements of FIG. 4 it is noted that the two primary types of elements are NAND gates such as 114 and 115 and flip-flops such as 110 and 111. The NAND gates produce a low output signal when all of the input signals are high. Under any other circumstance the NAND gate produces a high output signal. The flip-flops each have inputs J and K, which are symmetrical and outputs Q and Q which are also symmetrical. A further significant input is the T input which is the clocking input. Only when the input signal at T encounters a negative transition can the flip-flop respond to the input signals on terminals J and K.

A high input signal at J and a low input signal at K, in the presence of the clocking input, will cause the flip-flop to produce a high output signal at Q and a low output signal at Q̄. The R and S inputs are always effective and, if S is low it forces Q high and Q̄ low, if R is low it forces Q low and Q̄ high. In FIG. 4 the positive power supply is connected at terminal 201 and ground is connected to terminal 200. The heat 1 potentiometer is connected between terminal 206 and terminal 205 with its wiper contact connected to terminal 203. The heat 2 potentiometer is connected between terminals 202 and 204 with its wiper contact connected to terminal 207. The integrator input comes from the zero detector (of FIG. 5 which is discussed below) through terminal 211 and another timing signal comes from the zero detector at terminal 213. The weld 1 and weld 2 signals are received through terminals 219 and 220. These last named signals are inputted to flip-flop 110 through its J and K inputs respectively and also inputted to gate 118. The output of gate 118 forms the input to gate 119. The same signal also is connected to the J input of flip-flop 111 and the output of gate 119 is connected to the K input of flip-flop 111. The timing signal from terminal 213 is connected as the inputs to gate 120, the output of which is connected as the input to gate 121. The same signal forms a clocking input to flip-flop 111 and 110, is the K input signal of flip-flop 112 and also is one of the inputs to gates 122 and 123. The Q output of flip-flop 110 forms one input to gate 114 and the Q̄ output of flip-flop 110 forms one input to gate 115. The Q output of flip-flop 111 forms the other input to gates 114 and 115 and also provides a clocking input to flip-flop 113. This same output also provides one input to gate 125. The Q output of flip-flop 111 provides an input to the base of Q11 through zener diode D13. The same signal provides an input to diodes D6 and D10 at their anodes. The positive power supply input at terminal 201 provides the J input for flip-flop 113, the K input to flip-flop 113 is connected to the ground terminal 200. The Q output of flip-flop 113 provides two input signals to gate 116. The output of gate 116 provides one of the input signals to gate 117, the second input to gate 117 being connected to the Q̄ output of flip-flop 113. The output of gate 117 is connected to the base of Q2. The collector of Q2 is connected through R1 to the reference potential at terminals 202 and 206. Directly connected to the collector of Q2 are the source of Q1 and Q3, the drain terminal of Q9 and one terminal of R3 and R24. The emitter of Q2 is connected to the cathode of zener diode D1 whose anode is connected to terminal 200. The cathode of diode D1 is also connected through R4 to one terminal of R22 and one terminal of C13. The other terminal of C13 is connected to terminal 200 and the other terminal of R22 is connected to terminal 201. A third input to gate 116 is through capacitor C10 whose other terminal is connected to terminal 200. The reset input of flip-flop 113 is connected to the output of gate 116.

The output of gate 114 is connected to the anode of diode D2, whose cathode is connected to one terminal of R5 and the gate terminal of Q3. The other terminal of R5 is connected to the drain of Q3. The output of gate 115 is connected to the anode of diode D3, whose cathode is connected to the gate of Q1 and one side of R2. The other terminal of R2 is connected to the drain of Q1. Also connected to the drain of Q1 is input terminal 203, and input terminal 207 is connected to the drain of Q3.

The cathode of zener diode D13 is connected, through R31, to the junction of C13 and R22. Also connected to the cathode of diode D13 is the base of Q11. The emitter of Q11 is connected, via R28, the junction of capacitor C13 and R22. Also connected to the emitter of Q11 is one terminal of C8 and the anode of D12. The collector of Q11 is connected to the anode of D11 and, through R32 to terminal 200. Also connected to the collector of Q11 is one terminal of capacitor C12, the other terminal of capacitor C12 is connected between one terminal of R20 and the cathode of D8. The anode of D8 is connected to the cathode of Q8 and, through C11 to the gate of Q8. The gate Q8 is also connected to the other terminal of R20 and through R19 is connected to the Q output of flip-flop 112. The Q̄ output of flip-flop 112 is connected through R15 to one terminal of R16, one terminal of C9 and the gate of Q7. The other terminal of C9 is connected to the cathode of Q7 and the anode of D7. The cathode of D7 is connected to the other terminal of R16 and the other terminal of C8. The cathodes of D11 and D12 are connected together, the anode of D11 is connected to the collector of Q11. Connecting the cathodes of D11 and D12 is one terminal R17 and one terminal of R21. Connected to the other terminal of R17 is the anode of Q7 through R29. The anode of Q8 is connected to the other terminal of R21 through R27. A junction of R29 and R17 is connected to terminal 212 while the junction of R27 and R21 is connected to terminal 208. The junction of R21 and R17 is connected to terminals 209 and 210. The set input of flip-flop 112 is connected to the Q output of flip-flop 111. The J input of flip-flop 112 is connected to the output of gate 121 and the T input of flip-flop 112 is connected to the output of comparator 127.

The Q output of flip-flop 112 forms one input to gates 123 and 124. The output of gate 123 provides one input to gates 122 and 124. The output of gates 122 and 124 each provide an input to gate 125. The output of gate 125 is connected to the base of Q5 through R12, the base of Q6 through R13 and the base of Q10 through R26. The collector of Q5 is connected to terminal 200 as is one terminal of R11. The emitter of Q5 is connected to one terminal of C6, the other terminal of which is connected to terminal 200. The other terminal of R11 is connected to one terminal of R14, the other terminal of which is connected to R18, the other terminal of which is connected to terminal 211. A wiper on R14 is connected through R10 to one terminal of C6. C6 is connected across the input to amplifier 126. The output of amplifier 126 is connected through C5 to one terminal of C6. The one terminal of C6 is also connected to the emitter of Q6. The collector of Q6 is connected to the output of amplifier 126 and one input to comparator 127. The other input to comparator 127 comes from the drain of Q4 and one terminal of R6. The other terminal of R6 is connected to the cathode of D6 and the gate of Q4. The source of Q4 is connected to one terminal of C1, one terminal of R23, the wiper of R23 and the source of Q9. The other terminal of C1 is connected to terminal 200. The other terminal of R23 is connected to the other terminal of R3. The gate of Q9 is connected to the cathode of D10, the cathode of D9 and the other terminal of R24. The anode of D9 is connected to the collector of Q10, the emitter of Q10 is connected to terminal 200.

OPERATION

In order to understand the operation of applicant's invention, we will now explain how the control system performs a typical operation. Assume that the operator sets into the heat 1 setting switch a 90 percent heat setting value, to the heat 2 switch an 85 percent heat intensity value, a weld 1 duration time period of 10 cycles, a delay duration of 5 cycles, and a weld 2 duration of 15 cycles. These values will be retained in the respective thumbwheel switches as shown in FIGS. 1 and 2. Prior to discussing the operation of the circuit, we will assume that the four-stage stepper 20 is in its zero stage thus inhibiting gates 13, 14 and 15 (shown in FIG. 2) and with the following initial conditions in the circuit of FIG. 4. The inputs to terminals 219 and 220 will be high indicating no welding operation is being called for. The input at terminal 213, from the zero detector, will be a square wave, with a 60 hz repetition rate, and a pulse duration of approximately 8.33 milliseconds, synchronized to the 60 hz line voltage. The input of terminal 211, from the zero detector will be a full wave rectified sine wave. The input of terminal of 203 will be the steady-state voltage derived from the heat 1 setting of 90 percent and will correspond to 10 percent of the reference voltage. The input at terminal 207 will be a steady-state voltage calling for an 85 percent heat intensity weld, and thus would represent 15 percent of the reference voltage. The reference voltage itself is applied to terminals 202 and 206.

Since both inputs, 219 and 220, are high, the output of gate 118 will be low and the output of gate 119 will be high. Since the input to gate 120 is the square wave defined above, its output will be identical in form, and 180° out of phase. On the first negative-going transition of the output of gate 120, after both inputs 219 and 220 are high, the flip flop 111 will respond to its inputs on terminals J and K and produce corresponding outputs, that is the output on Q will be low and the output on Q will be high. At the same time, the output of flip-flop 110 will assume the same state. The low Q output of flip-flop 111 causes the output of both gates 114 and 115 to be high. These high outputs, on the anodes of D2 and D3, render Q1 and Q3 off. The high output of Q of flip-flop 111 renders Q11 off. This effectively inhibits any charging of capacitor C12, which can only charge through Q11. As will be explained later, the welding operation ceases with the Q output of flip-flop 112 low and the Q output of flip-flop 112 high thus effectively inhibiting capacitor C8 from charging. Thus, prior to the time a weld is called for, neither capacitor C12 nor C8 can charge. Since the Q output of flip-flop 111, which is low, is connected as one input to gate 125, its output must be high, regardless of its other two inputs. This high output ensures that both Q5 and Q6 will be on, effectively short-circuiting capacitor C5, inhibiting any integration by amplifier 126. The fact that Q5 and Q6 are on also effectively grounds one input to comparator 127 thus ensuring it will not produce an output pulse. The lack of any output signal from comparator 127 effectively inhibits flip-flop 112 from responding to the continually changing inputs it receives from gates 120 and 121. The Q output of flip-flop 111, being high, inhibits Q4. Although D9 is back biased it cannot render conductive Q9 since D10 is forward biased. Capacitor C1 is thus charged to the reference voltage on terminals 202 and 206 through R1, R3 and the portion of R23 selected by the wiper.

The arrangement of flip-flop 113, gates 116 and 117, and Q2 is designed to produce a transition voltage on capacitor C1 just subsequent to a welding operation and when no welding is going on the Q output is low, the output of gate 116 is high, and the output of gate 117 is low, thus inhibiting Q2. Flip-flop 113 will change state only at the end of a welding operation and then, for a short period of time as will be explained later. This flip-flop does not respond to its J and K inputs except when the clocking input at T encounters a negative transition. This only occurs at the end of a welding operation when the Q output of flip-flop 111 goes low.

Terminals 208–210 and 212 are connected to the gate inputs in FIG. 6 for the main SCR's Q27 and Q28. These terminals will carry on output signal when, and only when, either Q8 or Q7 is fired. As has been explained above, since C8 is uncharged, Q7 cannot be fired. Since the Q output of flip-flop 112 is low, Q8 will not be fired absent a proper initiate welding signal.

When the start welding sequence is initiated, the four-stage stepper 20 steps to its first stage enabling gate G13 to pass to the register 26 the weld 1 duration which we had postulated as 10 cycles. At the same time the counter 18 is enabled to begin counting signals supplied by the zero detector. Also, the input to terminal 219 will go low indicating the initiation of weld 1 operations. However, at this time, the only change that will occur is that the output of gate 118 will go high (since it now has one high input and one low input) and the output of gate 119 will go low. Neither flip-flop 110 nor 111 responds to this change in input signals as the clocking signal is not yet present. At the first subsequent positive transition of the AC line voltage, the square wave input to terminal 213 will encounter a positive transition. The output of gate 120 will be a negative going signal which will enable both flip-flops 110 and 111 to respond to their now changed input conditions. Thus, flip-flop 110 will produce a low output signal at its Q output and a high output signal at its Q terminal. At the same time, the Q output of flip-flop 111 will go high and the Q output of flip-flop 111 will go low. This will enable Q11 to charge C12. The positive going transition on the Q output of flip-flop 111 has no effect on flip-flop 113 as this will only respond to a negative going input on its T input terminal.

Prior to this negative going transition at the output of gate 120, the input to gate 123 had been one high, from the output of gate 120, and one low from the Q output of gate 112. Therefore, the negative going transition causes no change in the output of 123 and it remains high. One input to gate 124 was the output of gate 123 which remained unchanged at high. The other input to gate 124 is the Q output of flip-flop 112 which also remained unchanged as low producing a high output which does not change in response to the negative going transition at the output of gate 120. However, previous to this negative going transition one input to gate 122 was the high output of gate 123 and the other input was the high output of gate 120 producing a low output of gate 122. At the negative going transition this low output of gate 122 changes to a high output. One input to gate 125 was the output of gate 124 which remained unchanged at high. A second input to gate 125 was the Q output of flip-flop 111 which went from a low prior to the negative going transition from gate 120 to a high subsequent thereto. The third input to gate 125 was the output of gate 122 which also made a transition from a low to a high on the negative going transition of the output of gate 120. Thus, the output of gate 125 goes low in response to the negative going transition of the gate 120 and the change of state of flip-flop 111. This output going low turns off transistors Q5, Q6 and Q10. Transistors Q5 and Q6 turning off enable the amplifier 126 to begin integrating its input waveform from terminal 211, derived from the zero detector. Thus, the output of amplifier 126 begins to describe the waveform shown in FIG. 3B.

The high Q output of flip-flop 111 and the high produced at the Q terminal of flip-flop 110 produces a low output from gate 115, which had previously been high. This low output, coupled through D3 enables Q1 to transmit the heat intensity setting (heat 1 in FIG. 2) to one terminal of R3 and the drain terminal of Q9. However, when Q5 and 6 turned off so did Q10, keeping Q9 off through D9. Thus, capacitor C1 which had been charged to the maximum, or reference potential, begins to discharge down to the voltage set on the potentiometer, heat 1. The time constant for this change in voltage on capacitor C1 is determined by the value of C1 and resistors R3 and the portion of R23 selected by the wiper. The negative going transition at the Q output terminal of flip-flop 111, which turned on Q11, also enables Q4. This provides the capacitor C1 voltage at the drain terminal of Q4 which forms one input to comparator 127.

When a voltage input to comparator 127 from the integrator amplifier 126 reaches the level of the other input to comparator 127, from capacitor C1 through Q4, a negative output voltage is produced and transmitted to the T input of flip-flop 112. Since the integrator began integrating with the negative going output of gate 120, the comparison is effected between the time the output from gate 120 goes negative and prior to the time it goes positive again. Thus, when the negative input to the T terminal of flip-flop 112 occurs, the J input to flip-flop 112 will be positive. (A positive output is produced from gate 121 due to the negative input.) This causes flip-flop 112 to change state producing a high on its Q output terminal and a low output on its Q output terminal. The high output on the Q output terminal enables Q8 to fire the charge accummulated on capacitor C12. This provides a pulse at the junction between resistors R27 and R21 to one of the SCR's in the weld switch 19 through terminal 208. The weld switch 19 is shown in more detail on FIG. 6 and will be explained later.

At the same time, the Q output of flip-flop 112 going low enables capacitor C8 to charge. The positive transition at the Q output of flip-flop 112 causes gate 124 to change state. Previously it had received one high output from gate 123 and a low output from the Q terminal of flip-flop 112. When this terminal goes high, gate 124 changes state and goes low. The low output of gate 124 inputted to gate 125 causes the output of gate 125 to go high which turns on transistors Q5 and Q6. As has been explained before, when these transistors are on, capacitor C5 is short circuited to ground and the integrator amplifier 126 cannot operate. This condition remains until the negative going transition of the 60 cycle voltage waveform which produces a positive going transition at the output of gate 120. That positive going transition produces a negative going transition from gate 121. However, inasmuch as the T input to flip-flop 112 is no longer negative going the flip-flop cannot respond to the change in its J and K input terminals. However, the high output produced from gate 120 causes gate 123 to change state. Previously, gate 123 had received a high output from the Q terminal of flip-flop 112 and a low output from gate 120. When gate 120 produces a high output gate 123 changes state and produces a low output. However, since gate 120 is now producing a high output, gate 124 has input thereto, a low from gate 123 and a high from the Q output of flip-flop 112 thus it changes to produce a high output. The high output from gate 122 is unchanged as its input from 123 has changed to a low input. Therefore, gate 125 has inputted thereto three highs and produces a low input signal thus again initiating operation of the integrator to time out another cycle of operation.

During the first cycle of operation, C1 had been changing its level from the reference value to the value selected by the heat 1 pot, through terminal 203. The time constant for this change is determined by the values of C1, R3 and the portion of R23 selected by the wiper. However, after the first cycle, when Q5 and Q6 turned on so did Q10. Now both diodes D9 and D10 are reverse biased, D9 by the low potential on the collector of Q10 and D10 by the low potential on the Q output of flip-flop 111. At this time C1 is raised to the potential selected by heat 1 through terminal 203, Q1 and Q9. Therefore only during the fist cycle the total phase delay is that selected by the potential on heat 1 plus the delay determined by C1, R3 and R23. On each subsequent weld cycle the delay is only that selected by the potential on heat 1. Again, during the second cycle the integrator 126 is producing the waveform shown in FIG. 3B and the comparator 127 is comparing that rising voltage with the constant value on C1, as transmitted by Q4. Subsequent to the time of the comparator output 127 which had caused flip-flop 112 to change state ending up with its Q output high and its Q output low, capacitor C8 was enabled to charge. Now, when comparator 127 produces another output pulse indicating the rising waveform of FIG. 3B, from amplifier 126 has reached the values of the voltage set on capacitors C1 from the pot heat 1, flip-flop 112 again changes state to produce a low output signal on its Q terminal and a high output signal on its Q terminal. This allows SCR Q7 to conduct and the voltage dropped across resistor R29 is outputted through terminal 212 to the weld switch 19 of FIG. 2.

We have just described how two signal pulses are produced, one from Q8 and one from Q7, to alternately fire the main SCR's Q27 and Q28 in the weld switch 19. After each SCR, either Q8 or Q7 fires the capacitor associated with the other SCR either C8 or C12 is enabled to charge and the integrator 126 is turned off until the next zero crossing of the voltage waveform. At that time, it begins to produce the waveform of FIG. 3B which is then compared with the reference value on capacitor C1 to determine when the next firing signal will be produced. After the next firing signal is produced, the change in state of flip-flop 112, which allowed the signal to be produced, also causes gate 125 to produce a high output turning off the integrator and awaiting the next zero crossing before beginning a new cycle.

As has been explained previously, the weld 1 duration had been set in register 26, of FIG. 2, by the gate 13 when the weld 1 signal was produced. Each positive zero crossing increments the counter 18. The value of counter 18 is compared with the value in register 26 by comparator 16, of FIG. 2. When the counter 18 reaches the register value of 10 cycles, which we had postulated for this example, the comparator produces an output signal to step the four-stage stepper 20 to its next stage. The removal of the counter from its first stage removes the weld signal and causes terminal 219 of FIG. 4 to go high again. It will be recalled that we stated previously that flip-flop 112 has its Q output low when not welding and that Q8 was the first to fire when welding commenced. Since it is imperative that the current through the welding transformer alternate in sense, it is imperative that flip-flop 112 be left in the condition so that the first current pulse of the next cycle will begin with Q8 thus ensuring that the transformer is alternately fired in opposite senses. The manner in which this is effected will now be explained.

Assume that the welding signal ceases while Q output of flip-flop 112 is high, that is, sometime after Q8 is fired and before the next zero crossing of the voltage waveform. The Q output of flip-flop 112 went high when the output of gate 121 was high and the comparator 127 produced an output. The output of gate 121 can only be high when its input is low, and therefore the input to gate 120 was high, indicating a positive going zero crossing of the voltage waveform. Since that occurs prior to the time we have postulated the welding signal ceases, the next zero crossing of the voltage waveform will be in the negative direction and the output of gate 120 will be a positive transition. The cessation of the welding signal on pin 219 causes both pins 219 and 220 to be high forcing the output of gate 118 to be low and the output of gate 119 to be high. However, when that occurs neither flip-flop 111 nor flip-flop 110 responds since they can only respond to their inputs on a negative going transition on the T input terminal. However, as we have just explained, the next zero crossing will cause a positive transition from gate 120 and thus neither flip-flop 110 nor flip-flop 111 responds to the absence of the welding signal. As explained above, the zero crossing transition from gate 120 causes gate 125 to go low enabling the integrator to again begin producing the waveform of FIG. 3B which is then again compared with the reference voltage on capacitor C1. When the integrator output exceeds the level on capacitor C1, a negative going output voltage from comparator 127 causes flip-flop 112 to change state with its Q output now low and its Q output now high. This, as has been explained above, causes Q7 to fire and also allows capacitor C12 to begin charging, and also causes the output from gate 125 to go high thus inhibiting the production of the waveform of FIG. 3B from the comparator. The next zero crossing, however, will now be positive going and produce a negative output at gate 120. This will allow flip-flops 110 and 111 to respond to their input signals and cause the Q output of flip-flop 111 to go low and the Q output of flip-flop 111 to go high. The last named output signal turns off transistor Q11 inhibiting further charging of C12; since the Q output of flip-flop 112 is high, capacitor C8 cannot charge. The low output from the Q terminal of flip-flop 111 causes gate 115, which had been producing a low signal in response to its previously two high input signals, now produces a high output signal which, through diode D2 inhibits Q3, thus removing the potential source from capacitor C1, which however, had been charged to that potential. The Q output of flip-flop 111 going high also, through diodes D6 and D10 had turned off the FET's Q4 and Q9 thus opening the circuit between the capacitor C1 and the comparator 127. Thus, welding ceases with flip-flop 112 having its Q output low and its Q output high. Capacitor C12 is charged thus readying Q8 for firing and capacitor C8 is uncharged thereby making it impossible for Q7 to fire.

When FET Q4 was turned off, capacitor C1 has been charged to the potential on terminal 203, related to the heat 1 potentiometer. During the delay period this voltage on capacitor C1 will be changed to the reference potential, calling for maximum phase delay. However, since the length of the delay duration is variable, the capacitor must be slowly changed to the reference value so that if weld 2 is called for immediately after weld 1 or shortly thereafter, the delay potential will be somewhere between the value called for by the heat 1 setting and the reference potential. If the reference potential were immediately placed on capacitor C1 and weld 2 is immediately called for, the next firing of the weld switch would be with maximum delay which would result in unsymmetrical traverse of the hystersis loop of the transformer and could, on the next following cycle, cause the transformer to saturate. Therefore, the capacitor C1 must be slowly changed from the delay setting of the heat 1 potentiometer to the reference value.

The circuit of flip-flop 113, gates 116, 117 and Q2 is designed to perform this operation. When the Q output terminal of flip-flop 111 went low in response to the negative going output of gate 120 and the low output of gate 118 and the high output of gate 119, the T terminal of flip-flop 113 receives a negative going transition, allowing it to respond to its J and K input signals. Prior to this time, the Q output of flip-flop 113 was low. The reason for this will appear later. Since the input to gate 116 was low, its output will be high. The input to gate 117 will cause it to produce a high output signal, rendering Q2 non-conductive. The input terminal of flip-flop 113 J is tied to the positive power supply through resistor R22 and the K input is tied to ground through terminal 200. Thus, the Q output of flip-flop 113 will go high causing the gate 117 to produce a low output. This low output renders Q2 conductive. Thus, the reference potential which is on terminals 202 and 206 begins to charge up capacitor C1, from the potential which it has been at, that set by the heat 1 potentiometer, through resistor R2 and the portion of R23 which is selected by the wiper.

This operation, however, takes place over a limited amount of time. When the Q output of flip-flop 113 went high, capacitor C10 began to charge. When it charges up sufficiently to enable gate 116, its output goes low. The low output on gate 116 causes the output of gate 117 to go high rendering Q2 non-conductive and causing any further charging of capacitor C1 to be through the different circuit including R1, R3 and a portion of R23 which is selected by the wiper. When the output of gate 116 goes low, however, flip-flop 113 again changes state inasmuch as the output of gate 116 is connected to the reset input of flip-flop 113. Thus, the Q output terminal will go low producing again a high output from gate 116. The output of gate 117 does not change inasmuch as it now receives a high input from gate 116 and a low input from the Q output of flip-flop 113. Thus, Q2 remains non-conductive but the reset input to flip-flop 113 is again high allowing the flip-flop to change state upon the next negative going transition it receives at its input terminal T. This will occur only when the next welding operation ceases and the Q output of flip-flop 111 encounters a negative going transition. The net result of the operation is to begin charging C1 to the reference potential through R3 and a portion of R23 selected by the wiper. When Q2 turns off the charging circuit for this capacitor has R1 inserted therein to increase the time constant. As a result C1 slowly approaches the reference potential.

When the four-stage stepper 20 stepped to its second stage it enabled gate 14 to place the numerical contents of the delay duration thumbwheel switch in register 26 and the counter 18 began counting zero crossings as detected by the zero detector. Counter 18 had been reset when comparator 16 indicated that weld 1 had been completed. When counter 18 reaches the value set in register 26, comparator 16 again produces an output signal, indicating the delay duration had been completed, stepping four stage stepper 20 to its third stage and resetting the counter 18.

At this time the weld 2 signal is produced, gate 15 is enabled to transmit the weld 2 duration numerical contents to register 26 and the counter 18 again begins counting.

The weld 2 signal is reflected in FIG. 4 by terminal 220 going low. This causes the same operation in the circuit of FIG. 4 as was explained above with respect to the weld 1 signal going low. The only difference, however, is that instead of enabling FET Q1 to place the heat 1 potentiometer setting from terminal 203 on to capacitor C1, FET Q3 is enabled to place the heat 2 setting from terminal 207 to capacitor C1. In all other respects the operation is identical and Q7 and Q8 begin alternately firing and producing output signals to the weld switch 19 to alternately cause current to flow in the welding transformer in opposite senses. As has been explained above, flip-flop 112, just prior to the initiation of the welding signal, has its Q output low and its Q output high and therefore Q8 will be the first SCR to fire. This will occur when the comparator 127 indicates that the voltage on capacitor C1 is equal to the integrated signal produced by integrator 126. Also, as explained above, again, during the first cycle capacitor C1 is slowly discharged from the reference potential toward the potential on terminal 207 through R3 and a portion of R23 selected by the wiper. After the first cycle of operation, Q9 is enabled to short out these two resistors and place the heat potentiometer setting from terminal 207 directly onto the terminals of capacitor C1. Thus, the second and subsequent operations cause the firing delay only as selected by the heat 2 potentiometer setting. As in the case of weld 1, when counter 18 counts up to the value in the register 26, comparator 16 produces a signal to reset counter 18 and step four-stage stepper 20 to its next or zero stage. This removes the weld 2 signal from terminal 220 and welding ceases as explained before. Also at the termination of the weld 2 operation, the circuit of flip-flop 113, gates 116, 117 and Q2 again slowly raises C1 from the potential of the heat 2 setting toward the reference potential.

DETAILED DESCRIPTION OF ZERO DETECTOR

Zero detector, shown in FIG. 2, has been referred to a number of times as supplying certain signals to the circuit of FIG. 4. The zero detector is shown in more detail in FIG. 5. Before explaining how this circuit operates, reference will be made to the input and output signals applied to this circuit and then to the normal conditions of the circuit.

Terminals 320 and 321 are connected across the secondary of the control transformer T3 of the weld switch 19. The voltage across these terminals then is the voltage across the silicon control rectifiers of the welding switch 19. Terminal 315 is connected to terminal 211 of FIG. 4 and provides the voltage signal which is integrated by integrator 126, on FIG. 4. Terminals 304 and 305 are connected through terminals 219 and 220 of FIG. 4 and receive the weld 1 or weld 2 signals from four-stage stepper 20 of FIG. 2. Terminal 303 is a contactor grounding this terminal until the system power supply reaches its nominal range. This is used only for the power-up of the system and has no other function. Terminal 302 is connected to terminal 213 on FIG. 4 and supplies the 60 hz square wave, synchronized to the power line frequency. Terminal 311 is the switch fault output terminal. A pulse is produced here if the circuit detects a lack of voltage on the welding switch 19. Terminal 313 is the current fault output terminal and it produces a pulse when the circuit determines that no current is flowing through the welding transformer when welding had been requested. The presence of a signal on either of these terminals sets the fault indicator 25, of FIG. 2, and also lights either indicator light 7 or 8 on the panel of FIG. 1, depending upon which signal is produced. At the same time, four-stage stepper of FIG. 2 is reset to cease welding operations.

Figure 5:
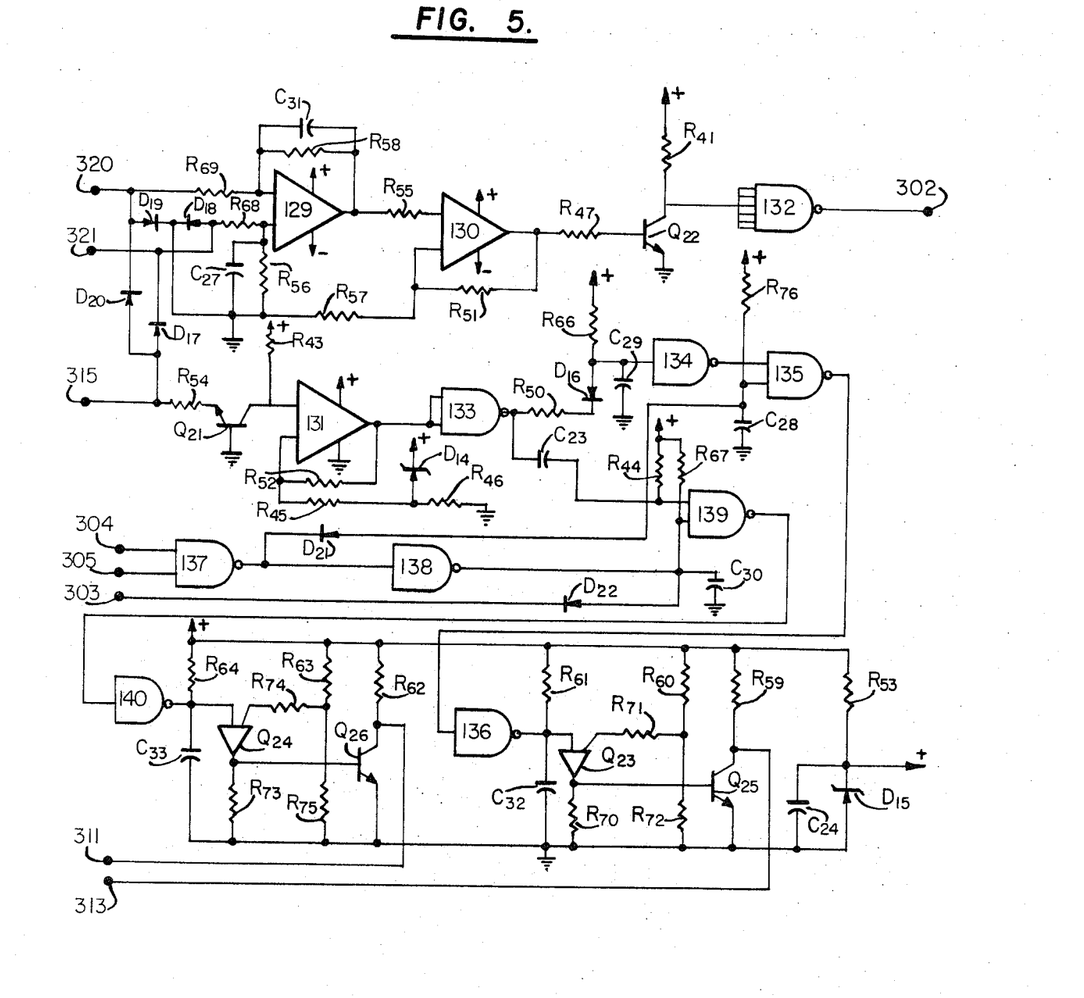
FIG. 5 is a circuit diagram of the zero crossing detector portion of applicant's control circuit.

Terminal 320 is connected to the cathode of D20, the anode of D19, and one input terminal of amplifier 129 through resistor R69. Terminal 321 is connected to the cathode of D17, the anode of D18 and the other input terminal of amplifier 129 through resistor R68. The anodes of D20 and D17 are tied together and connected to terminal 315. They are also connected through resistor R54 to the emitter of Q21, whose base is grounded and whose collector is connected, through R43 to a positive potential supply. The collector of Q21 is also connected to one input of amplifier 131. The first input terminal of amplifier 129 is connected to the output of amplifier 129 through the parallel combination of resistor R58 and capacitor C31. The output of amplifier 129 is connected to one input terminal of amplifier 130 through resistor R55. The other input terminal of amplifier 130 is connected through resistors R57 and R56 to the other input terminal of amplifier 129. The junction of resistors R57 and R56 is grounded, and is connected to the junction of the cathodes of D19 and D18. The other input terminal of amplifier 129 is also connected to ground through capacitor 27. The other input terminal of amplifier 130 is connected, through resistor R51, to its output terminal. The output of amplifier 130 is connected through resistor R47 to the base of Q22. The emitter of Q22 is grounded and its collector is connected to a positive source of potential through resistor R41. The collector of Q22 also forms the input to gate 132. The output of gate 132 is connected to pin 302.

The other input terminal of amplifier 131 is connected to its output through resistor R52 and is also connected through resistors R45 and R46 to ground. The junction of resistors R45 and R46 is connected to the anode of zener diode D14, whose cathode is connected to a positive source of potential. The output of amplifier1131 forms the input to gate 133. The output of gate 133 is connected through resistor R50 to the cathode of D16, whose anode is connected through resistor R66 to a positive source of potential. The anode of D16 is connected to the input of gate 134 whose input terminal is connected to ground through capacitor C29. The output of gate 134 forms one input to gate 135. Also connected to the output of gate 133, through capacitor C23, is one input of gate 139. That same input terminal of gate 139 is connected through resistor R44 to a positive potential supply. Input terminals 304 and 305 form the inputs to gate 137 whose output is connected as the input to gate 138. The output of gate 137 is connected to the cathode of D21 whose anode is connected to ground through capacitor C28. The junction of C28 and D21 is connected, through resistor R65, to a positive source of potential and also forms the other input to gate 135. The output of gate 138 is connected to ground through C30. The output of gate 138 is also connected as the other input to gate 139 and is connected to the anode of D22 whose cathode is connected to contact 303. The output of gate 138 is also connected, through resistor R67, to a positive source of potential. The output of gate 139 forms the input to gate 140. The output of gate 140 forms the signal input to the switch fault timer circuit. The timer itself is composed of resistor R64 and capacitor C33 connected between a positive source of potential and ground. The output of gate 140 is connected to the junction of R64 and C33 which is also connected to the anode of Q24, the cathode of which is grounded through resistor R73. The gate of Q24 is connected through R74 to the junction of R63 and R75 which are connected between a positive source of potential and ground. The cathode of Q24 is connected to the base of Q26 whose collector is connected to the positive source of potential through R62. The emitter of Q26 is grounded. The output of the timer is taken at the collector of Q26 to terminal 311.

The output of gate 135 is connected as the input to gate 136. The output of gate 136 provides the input to the current fault timing circuit. This circuit is made up of R61 and C32 connected between the positive source of potential and ground. The output of gate 136 is connected to the junction of R61 and C32. Also connected to that point is the anode of Q23 whose cathode is connected to ground through R70. The gate of Q23 is connected, through R71, to the junction of R60 and R72, the combination of which is connected between the positive source of potential and ground. The cathode of Q23 is connected to the base of Q25 whose emitter is grounded. The collector of Q25 is connected to the positive source of potential through R59. The current fault output terminal 313 is connected to the collector of Q25. Also connected between the positive source and potential and ground is R53 and the parallel combinations of C24 and D15. The anode of D15 is grounded and the cathode is connected to R53.

The voltage across the secondary of the control transformer T3, contained in the weld switch 19, is applied to the circuit of amplifiers 129 and 130, transistor Q22 and gate 132. The output of gate 132 supplies the 60 cycle square wave, synchronized to the line voltage to pin 302 which is connected to pin 213 on FIG. 4. Sufficient amplification is provided in amplifiers 129 and 130 so that even when the weld switch is fired the small (approximately 0.7 volts) voltage across the control transformer is sufficient to saturate the amplifiers and still produce the necessary square wave. The combination of diodes D20 and D17 feed a fully rectified sine wave to terminal 315 which is connected to terminal 211 on FIG. 4. This provides the voltage for the integrating amplifier 126 to integrate. When the weld switch fires, of course, this voltage goes to approximately zero, but that is immaterial inasmuch as the integrator has performed its function and has been reset so as to cease integration in any event. The input signal at the junction of the anodes of D17 and D20 also feeds Q21 and through amplifier 131 drives both the switch fault and current fault timers. If either of these timers times out, producing a negative going signal, it indicates eiither a switch fault or a current fault depending upon the one that has timed out.

OPERATION

Figure 7B:
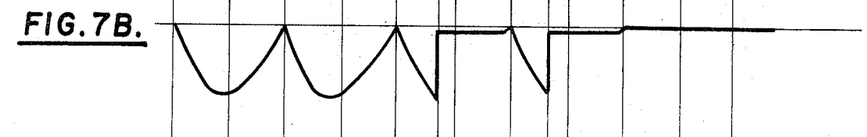
Figure 7C:
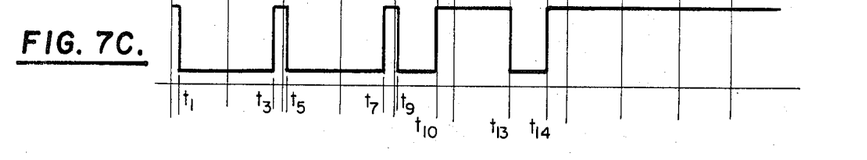

With the aid of the waveform shown in FIGS. 7A, B and C, the operation of the circuit will be explained. The waveforms shown in this figure are representative although the sequence of these waveforms would not necessarily be encountered.

FIG. 7A shows the voltage at the weld switch 19. During the first cycle shown, from T0 through T8 no welding takes place and the voltage describes the normal sinusoidal curve. At T10, however, the voltage, which had been rising, dropped suddenly to approximately zero. The vertical arrows, located just after T11, are intended to represent the small positive value of voltage at this time. This waveform is indicative of one of the SCR's having been fired so that welding would have occurred between T10 and T12. A similar waveform, although in the opposite sense, is shown between T12 and T14. The drop again substantially to zero at T14 indicates that welding is again taking place, caused by firing of the complementary SCR. As has been explained above, this alternative operation is mandatory in order to avoid saturating the welding transformer. Subsequent to time t16 no voltage at all is present under welding transformer.

FIG. 7B shows the resultant waveform at the emitter of Q21. Aside from inverting the positive phase of the waveform shown in FIG. 7A, the waveform in FIG. 7B is identical. FIG. 7C shows the voltage at the collector of Q21, caused by the emitter voltage shown in FIG. 7B. Initially, with the zero voltage on the emitter, the collector is biased at the potential of the source. However, as the emitter voltage goes negative, it exceeds the threshold level for this transistor at time t1 turning Q21 on and dropping its collector voltage to an amount near zero. So long as the emitter voltage remains below the threshold the transistor continues to conduct holding its collector near zero. At time t3, however, the emitter voltage has decreased (in the absolute sense) below the threshold level and the transistor turns off. At time t5, however, the transistor is again turned on and remains on until t7. In a like manner the transistor remains off between t7 and t9 and then turns on at t9. Conduction of the SCR at t10 drops the voltage on the emitter of Q21 to a value below its threshold and thus turns Q21 off raising its collector voltage. The collector voltage remains high until t13 when the emitter voltage again rises above the threshold level and turns the transistor on. At time t14 the transistor is again cut off. The transistor remains off due to the absence of any voltage on its emitter subsequent to time t14.

The collector voltage of Q21, shown in FIG. 7C, between times t1 and t7, is indicative of a current fault in the welding operation if welding had been requested. This waveform represents that welding has not occurred and therefore will be recognized by the circuit as a current fault. The waveform between t9 and t13 is a normal waveform encountered during welding operations and will not be recognized by either fault detector in this circuit. However, the fact that Q21 remains off for a continuous period of time, after t14, is indicative of a switch fault, that is lack of voltage at the welding switch. This will be recognized by the circuit and signalled as a switch fault.

Before describing the fault portion of the zero detector, the initial conditions of this circuit will be described.

The inputs to gate 137 from terminals 304 and 305 are normally high indicating no weld is being called for. When no welding is being called for, the circuits are disabled by the low output of gate 137. During the start-up sequence, however, sufficient voltage may not be available to drive gate 137 low and therefore the input to terminal 303 is grounded before full power is applied in the power source. This ensures that the output of gate 139 will remain high until sufficient power is available to drive gate 137 low to thus disable the circuit.

Both the current fault timer and switch fault timer require a predetermined amount of time to elapse before they will indicate a fault. This time period is determined by R64 and C33 for the switch fault timer and R61 and C32 for the current fault timer. If either capacitor 33 or 32 charges sufficiently to fire Q24 or Q23, that will cause either Q26 or Q25 to fire indicating a fault. If no welds are being called for, however, the inputs to gate 137 cause the following results. The output of gate 137 being low causes gate 135 to be high and the output of gate 136 to be low prohibiting capacitor 32 from charging up. The low output from gate 137 causes a high output from gate 138 which enables gate 139 to respond to its other input signal from gate 133 through capacitor C23. As will be seen from FIG. 7C, when no welding is being called for or when welding is taking place, the collector of Q21 exhibits repeated negative transitions. These are amplified by amplifier 131 and cause similar negative transitions from the output of gate 133. These negative transitions are coupled through capacitor 23 to one input terminal of gate 139. Since the other input terminal to gate 139 is continually high, the output of gate 139 is normally low but exhibits a number of pulses. This pattern is inverted by gate 140 and the normally high input is interrupted with sufficient frequency to keep capacitor C33 from charging sufficiently to fire at Q24. As will be seen from FIG. 7C, when no voltage is applied to the primary of the welding transformer the collector of Q21 remains high. This is reflected by a high output of gate 133 which causes gate 139 to produce a low output which is inverted by gate 140 producing a high output. The high output from gate 140 allows C33 to charge sufficiently to fire Q24 which in turn enables Q26 to conduct putting out a signal indicating a switch fault. Thus, the absence of voltage on the emitter of Q21 has been translated to a switch fault.

When welding is being called for the output of gate 137 is high thus enabling gate 135 to respond to its other input. Normally, capacitor C29 is charged through resistor 66 resulting in a high input to gate 134 which produces a low output to gate 135. This produces a high output of gate 135 which causes gate 136's output to be low inhibiting capacitor C32 from charging sufficiently to fire Q23. This inhibits Q25 from conducting and inhibits the output of a current fault indication. The actual flow of current in the welding transformer causes the output of Q21's collector to be high which is reflected at the output of gate 133 with a high output which keeps capacitor 29 from discharging. However, if the voltage on the emitter of Q21 enables it to be on for a sufficiently long period of time, such as the time between t1 and t3, or between t5 and t7, the low voltage at the collector of Q21 caused by this operation is reflected in a low output of gate 133 which enables capacitor C29 to discharge sufficiently to produce a high output of gate 134, which forms the input to gate 135. It will be recalled that the other input to gate 135 was high so long as the welding operation was being called for. This then will produce a low output of gate 135 which will appear as a high output of gate 136 which will enable capacitor C32 to charge sufficiently to fire Q23 and thus turn on Q25, producing a current fault indication. Thus, long periods of transistor Q21 being on will result in a current fault indication. The long periods of high voltage across the secondary of the control transformer T3 indicate that current is not flowing which is reflected as a current fault indication.

DETAILED DESCRIPTION OF WELD SWITCH

FIG. 6 shows the welding switch itself corresponding to weld switch 19 in FIG. 2. Q27 and Q28 are the main SCR's which allow current to flow in the welding transformer when signalled by the current switch driver of FIG. 4. The primaries of transformers T1 and T2 are connected to terminals 208 and 210 and 212 in FIG. 4 to transmit the firing signal to one or the other of Q27 or Q28, depending upon whether Q7 or Q8, in FIG. 4, has fired. Transformer T3 is the control transformer and its secondary is connected to terminals 320 and 321. The primary of this transformer is connected across the SCR's of the weld switch. Across its secondary are terminals 320 and 321 in FIG. 5. The voltage of FIG. 7A is that which is across the transformer T3.

In FIG. 6 one terminal of the secondary of transformer T1 is connected through fuse 1 to the cathode of Q28, the other terminal of the secondary of transformer T1 is connected through fuse 3 to the gate electrode of Q28 and to one terminal of the primary of transformer. T3. Connected across the gate and cathode of Q28 is capacitor C42. Connected across the secondary of T1 is R83. The other terminal of the secondary of transformer T1 is connected to one terminal of the secondary of transformer T3. The other terminal of the secondary of T3 is connected to one terminal of the secondary of T2, which is also connected through fuse 3 to the cathode of Q27. The other terminal of the secondary of transformer T2 is connected through fuse 4 to the gate electrode of Q27. Connected across the gate and cathode of Q27 is C43. Connected across the secondary of transformer T2 is R84. The anode of Q27 is connected to the anode of Q27 through R81, C41, and R82. The anode of Q27 is also connected to the cathode of Q28 and the cathode of Q27 is connected to the anode of Q28 and also to one terminal of R82. The primary of the welding transformer T4 is connected between one power source terminal and the anode of Q27. The other power source terminal is connected to the anode of Q28.

OPERATION

The operation of FIG. 6 is as follows. As the voltage from the power source rises, it is dropped across Q27 and Q28, one in the forward direction and one in the reverse direction. If no firing signal is present, this voltage will increase to a maximum and then decrease in the opposite sense. If a firing signal is presented to one or the other of Q27 or Q28, and if the voltage is dropped across that SCR in the forward direction, the SCR will fire allowing a flow of current through the welding transformer T4. As the current through the fired SCR decreases to zero, it will be extinguished and the flow of current will substantially cease. As the voltage increases in the opposite direction the other SCR may be fired depending upon the presence of a firing signal.

Because of the square hystersis loop characteristic of transformer T4, current must flow through it in opposite senses, alternately. If the circuit attempts to apply current to the transformer T4 twice in succession, in the same direction, the transformer will saturate, effectively short circuiting it which may result in great damage to the equipment. The circuit which prevents this from occurring is flip-flop 112 in FIG. 4 which causes Q7 and 8 to alternate in supplying firing signals to Q27 and Q28.

A further constraint on the control system is the requirement that the welding transformer be operated symmetrically about the axis of its hystersis curve. This requires that when one welding operation, using one phase delay signal ceases, the system must not change instantaneously to the reference or maximum phase delay for if another weld is called for shortly the transformer will not be symmetrically operated in its hystersis loop and this again may cause it to saturate. The circuit which performs this operation is the combination of flip-flop 113, gates 116 and 117, and Q2, in FIG. 4. In much the same manner, when welding is begun, the phase delay must be gradually decreased from the maximum or reference to the selected value. The circuit of FIG. 4 again accomplishes this function through Q10, D9 and D10, with the aid of R3 and R23.

I claim:

1. Alternating-current welding apparatus comprising:

a welding transformer of the type having a generally square hysteresis loop and with its primary winding energized by an alternating-current source,
a primary circuit for said transformer including at least two oppositely poled silicon controlled rectifiers each selectively controlling the application of current to the primary winding on a respective half-cycle of transformer primary current of a particular polarity,
and control means for selectively rendering one of said silicon controlled rectifiers conductive,
said control means including a memory means distinctively operated concurrently with the enabling of said one silicon controlled rectifier permitting a current pulse of one polarity through said transformer primary winding,
said memory means being effective to ensure that only the other said silicon controlled rectifier can be enabled on the next half cycle of current in said transformer primary winding so as to ensure that successive current pulses through said transformer winding are of opposite polarity thereby avoiding saturation of the transformer.

2. The apparatus of claim 1 which further comprises means for sensing the voltage on said primary and producing a signal when the voltage passes through zero,
delay means included within said control means, coupled to said last named means to provide an output a pre-selected time after the occurrence of said signal,
said output coupled to and operating said memory means and enabling one or the other of said silicon control rectifiers as determined by said memory means.

3. The apparatus of claim 2 which further comprises means effective only on the first half-cycle of current flow in said primary to increase said pre-selected time by a variable time related to said pre-selected time so as to minimize the transition between not welding and welding.

4. The apparatus of claim 3 which further comprises means effective only after the last welding half-cycle, to increase said pre-selected time by a variable time related to said pre-selected time so as to minimize the transition from welding and not welding.

5. Alternating-current welding apparatus comprising:

a welding transformer of the type having a generally square hysteresis loop and with its primary winding energized by an alternating-current source,
said primary winding circuit for said transformer including switching means for controlling the flow of alternating current through said primary winding during a variably controllable portion of each of successive half-cycles of the alternating current source,
heat intensity control means coupled to comparator means, said heat intensity control means providing a control signal of preselected amplitude which is linearly related to a preselected heat intensity demand,
means, also coupled to said comparator means, generating on each successive sine wave loop constituting a half-cycle of the transformer primary voltage a reference signal having a waveform corresponding to the integral of the sine wave loop,
said comparator means effective on each of successive half-cycles of the transformer primary voltage as said reference signal rises in amplitude to exceed said control signal to control said switching means permitting a flow of current through said primary winding, whereby the power delivered to said transformer secondary is linearly related to the preselected heat intensity demand.

6. The apparatus of claim 5 wherein said comparator produces a train of signals to
control said switching means,
said switching means comprises a pair of oppositely poled silicon control rectifiers each connected across said primary,
a bistable circuit coupled to said comparator for dividing the train of singals from said comparator into two alternate trains,
said bistable circuit means providing signals to control said silicon control rectifiers,
each of said alternate trains of signals respectively controlling one of said silicon control rectifiers.

7. A welding control circuit comprising,
switch means providing, at selected times a welding signal,
a welding transformer with primary and secondary windings, said primary winding being selectively excited by alternating current,
zero detecting means coupled to said primary winding to produce a repetitive signal once each time the voltage across said primary winding goes through zero,
a delay circuit coupled to said zero detecting means for delaying each of said repetitive signals by a variable predetermined amount,
a bistable circuit means coupled to said delay circuit producing alternate signals related to said repetitive signals,
and means, connected to said switch means, said bistable circuit means, and said primary winding to only allow current to flow in said primary winding in alternate directions successively.

8. The circuit of claim 7 wherein said delay circuit further comprises,
a linear circuit having an input and an output and producing an output which is linearly related to its input and calibrated in percent heat values,
a comparison circuit having two inputs and an output, said linear circuit output coupled to one said input of said comparison circuit,
integration means having an input and output and producing an output which is the integral of its input,
means connecting said integration means input to said primary,
said integration means being connected to said zero detecting means and responsive thereto to operate,
said output of said integration means connected to the other input of said comparison circuit,
said comparison circuit producing said repetitive signals whenever said integration means output exceeds said linear circuit output,
whereby said repetitive signals allow current to flow in said primary producing a heat output which is determined by the relationship between the input and output of said linear circuit.

9. The circuit of claim 8 which further comprises,
a second delay circuit including resistance means and capacitance means,
said linear circuit output connected to said comparison circuit through said second delay circuit,
second switch means connected across said resistance means,
means connected to said bistable circuit means and said second switch means for closing said second switch after each of said alternate signals produced by said bistable circuit means.

10. In the circuit of claim 9, further comprising,
means associated with said switch means for producing an end-of-weld signal,
third switch means,
said linear circuit output being connected to said second delay circuit through said third switch means, said third switch means being connected to said switch means and said associated means to close in response to said weld signal and open in response to said end-of-weld signal,
means connecting said linear circuit input to said second delay means through further resistance means, fourth switch means connected across said further resistance means, and
means responsive to said end-of-weld signal from said associated means for closing said fourth switch means for a predetermined time.

11. The circuit of claim 7 which further comprises fault detecting means coupled to said primary winding including
current fault detecting means to detect the absence of welding current flow.

12. The circuit of claim 11 which further comprises switch fault detecting means to detect the absence of a voltage applied to said last named detecting means.

* * * * *